United States Patent
Carmon et al.

(10) Patent No.: US 9,479,978 B2
(45) Date of Patent: Oct. 25, 2016

(54) METHOD FOR DETERMINING A HANDOVER BETWEEN A MACROCELL AND A FEMTOCELL

(75) Inventors: Rafael Carmon, Rishon-Lezion (IL); Alon Shechter, Herzeliya (IL)

(73) Assignee: Broadcom Corporation, Irvine, CA (US)

( * ) Notice: Subject to any disclaimer, the term of this patent is extended or adjusted under 35 U.S.C. 154(b) by 579 days.

(21) Appl. No.: 13/491,646

(22) Filed: Jun. 8, 2012

(65) Prior Publication Data

US 2013/0095835 A1 Apr. 18, 2013

Related U.S. Application Data (60) Provisional application No. 61/548,662, filed on Oct. 18, 2011.

(51) Int. Cl.
*H04W 36/00* (2009.01)
*H04W 36/04* (2009.01)
(Continued)

(52) U.S. Cl.
CPC ......... *H04W 36/0083* (2013.01); *H04W 36/04* (2013.01); *H04W 48/16* (2013.01); *H04W 84/045* (2013.01)

(58) Field of Classification Search
CPC ................... H04W 36/0061; H04W 36/0083; H04W 36/0066; H04W 36/0011; H04W 36/00; H04W 88/08; H04W 84/045; H04W 36/06; H04W 36/14
USPC .............................. 455/435.2–442, 436–444
See application file for complete search history.

(56) References Cited

U.S. PATENT DOCUMENTS 7,307,971 B2   12/2007   Park et al.
7,477,920 B2    1/2009   Scheinert et al.
(Continued)

FOREIGN PATENT DOCUMENTS

CN   101754303 A   6/2010
CN   101801049 A   8/2010
(Continued)

OTHER PUBLICATIONS

European Search Report for EP Patent Application No. EP 12006105.6, European Patent Office, Munich, Germany, mailed on Nov. 8, 2012.

(Continued)

*Primary Examiner* — Nathan Mitchell
*Assistant Examiner* — Dung Lam
(74) *Attorney, Agent, or Firm* — Sterne, Kessler, Goldstein & Fox P.L.L.C.

(57) ABSTRACT

Embodiments of this disclosure include methods in which a core network controller determines which femtocell base station to handover a cellular device to. Methods include comparing a cell parameter difference provided by a base station with a cell parameter difference provided by the cellular device. The cell parameter difference provided by the base station is the cell parameter difference between the base station and each neighboring base station. The cell parameter difference provided by the cellular device is the cell parameter difference between the base station through which the cellular device is currently associated with to the core network and each neighboring base station. The core network controller compares the cell parameter difference provided by the cellular device with the cell parameter difference provided by the base station. The core network hands the cellular device to the base station when the cell parameter difference provided by each are substantially equivalent.

15 Claims, 6 Drawing Sheets

(51) Int. Cl.
*H04W 48/16* (2009.01)
*H04W 84/04* (2009.01)

(56) References Cited

U.S. PATENT DOCUMENTS

| | | | |
|---|---|---|---|
| 8,306,540 | B2 | 11/2012 | Hsieh et al. |
| 8,345,633 | B2 | 1/2013 | Bradley et al. |
| 2009/0253461 | A1 | 10/2009 | Kuwahara |
| 2010/0124931 | A1 | 5/2010 | Eskicioglu et al. |
| 2010/0130222 | A1 | 5/2010 | Claussen et al. |
| 2010/0311422 | A1* | 12/2010 | Jun et al. ............ 455/436 |
| 2011/0076960 | A1 | 3/2011 | Yun et al. |
| 2011/0149885 | A1 | 6/2011 | Bachu et al. |
| 2011/0223913 | A1 | 9/2011 | Kho et al. |
| 2011/0250896 | A1 | 10/2011 | Takano |
| 2011/0287755 | A1 | 11/2011 | Cho et al. |
| 2011/0319086 | A1 | 12/2011 | Katori |
| 2012/0238268 | A1* | 9/2012 | Radulescu et al. ....... 455/435.1 |
| 2013/0029676 | A1 | 1/2013 | Guvenc et al. |
| 2013/0095836 | A1 | 4/2013 | Carmon et al. |
| 2013/0244736 | A1 | 9/2013 | Ho et al. |

FOREIGN PATENT DOCUMENTS

| | | | | |
|---|---|---|---|---|
| CN | 102014421 A | | 4/2011 | |
| CN | 102215536 A | | 10/2011 | |
| CN | 102217372 A | | 10/2011 | |
| CN | EP 2375807 A1 * | | 10/2011 | ........ H04W 36/0083 |
| EP | 1 983 786 A1 | | 10/2008 | |
| EP | 2079263 A1 | | 7/2009 | |
| EP | 2107840 A2 | | 10/2009 | |
| EP | 2 197 228 A1 | | 6/2010 | |
| EP | 2 214 434 A1 | | 8/2010 | |
| EP | 2299759 A1 | | 3/2011 | |
| EP | 2 375 807 A1 | | 10/2011 | |
| KR | 10-2011-0034827 A | | 4/2011 | |
| TW | 201136370 A1 | | 10/2011 | |
| WO | WO 2005/015917 A2 | | 2/2005 | |
| WO | WO 2010/066165 A1 | | 6/2010 | |
| WO | WO 2011/101998 A1 | | 8/2011 | |

OTHER PUBLICATIONS

Kwon, Sungoh et al., "Virtual Extension of Cell IDs in a Femtocell Environment," Wireless Communication and Networking Conference (WCNC), 2011 IEEE, IEEE, Mar. 28, 2011, pp. 428-433.

3GPP TSG RAN WG3 Meeting #61 (R3-081949), "Dynamic Setup of HNBs for Energy Savings and Interference Reduction," Mitsubishi Electric, Jeju Island, Korea, 18-22; 7 pages.

English-language abstract of CN 101801049 A, dated Aug. 11, 2010, 1 page.

Deutsche Telekom, "Green RAN: UE Based Reactivation of Deactivated RAN Nodes for Energy Saving," 3GPP Draft, R2-110116 Energy Saving, 3rd Generation Partnership Project (3GPP), Ireland, Jan. 2011 (9 pages).

3GPP Standard, "3rd Generation Partnership Project; Technical Specification Group Core Network and Terminals; Study on Impacts on Signaling Between User Equipment (UE) and Core Network From Energy Saving (Release 11)," France, Jun. 2011 (33 pages).

English-language abstract of CN 102014421 A, dated Oct. 3, 2011; 1 page.

English-language abstract of CN 102215536 A, dated Oct. 12, 2011; 1 page.

European Search Report for EP Patent Application No. EP 12007057.8, European Patent Office, Munich Germany, mailed Feb. 28, 2013 (4 pages).

Office Action directed to related Taiwanese Patent Application No. 101138251, mailed on Sep. 25, 2014; 10 pages.

Office Action directed to related Taiwanese Patent Application No. 101133019, mailed Oct. 28, 2014; 7 pages.

Office Action directed to related Chinese Patent Application No. 201210371776.5, mailed Oct. 30, 2014; 8 pages.

Office Action directed to related Chinese Patent Application No. 201210397929.3, mailed Nov. 3, 2014; 8 pages.

* cited by examiner

```
                                          500
┌────────────────────────────────────────────────┐
│ Request an unique identification of each base station │──510
│        from a plurality of base stations.      │
└────────────────────────────────────────────────┘
                        ↓
┌────────────────────────────────────────────────┐
│ Identify an ambiguity between each base station that │
│ each of have a substantially similar unique identification. │──520
└────────────────────────────────────────────────┘
                        ↓
                  ⟨Ambiguity?⟩── No ─────────┐
                        │ Yes               │
                        ↓                   │
┌────────────────────────────────────────────┐  │
│ Provide a cellular device signal measurement difference │
│ where the cellular device signal measurement difference │──530
│ is a signal difference between an original base station │
│ that includes an original cell that the cellular device is │
│       located in and a neighboring base station.  │  │
└────────────────────────────────────────────┘  │
                        ↓                   │
┌────────────────────────────────────────────┐  │
│ Provide a base station signal measurement where the │──540
│ base station signal measurement is a signal difference │
│ between each base station and the original base station. │
└────────────────────────────────────────────┘  │
                        ↓                   │
┌────────────────────────────────────────────┐  │
│ Compare each base station signal measurement with │──550
│       the cellular device signal measurement.     │
└────────────────────────────────────────────┘  │
                        ↓                   │
┌────────────────────────────────────────────┐  │
│ Execute a handover procedure for the cellular device │
│  from the original base station to the base station with │
│ the base station signal measurement that is substantially │◀─┘
│   equivalent to the cellular device signal measurement. │──560
└────────────────────────────────────────────┘
```

FIG. 5

METHOD FOR DETERMINING A HANDOVER BETWEEN A MACROCELL AND A FEMTOCELL

CROSS-REFERENCE TO RELATED APPLICATIONS

The present application claims the benefit of U.S. Provisional Patent Appl. No. 61/548,662, filed Oct. 18, 2011, which is incorporated herein by reference in its entirety.

BACKGROUND

1. Field of Disclosure

The present disclosure relates generally to cellular networks and specifically to the handing over of a cellular device from one cell member to another cell member.

2. Related Art

The demand for wireless data consumption has increased exponentially to such a level that sparsely placed outdoor macro base stations can no longer provide sufficient wireless service coverage to support the increased demand for wireless data. The quantity of smart phones, smart tablets, and laptops that are accessing social networks, online gaming, streaming online videos, and other traditional personal computer applications that are now available on cellular devices have put a significant strain on the traditional wireless infrastructure supported by macro base stations. Adding more macro base stations to the wireless infrastructure to meet the demand for wireless data consumption is often times not feasible. Macro base stations are expensive and require a significant amount of outdoor space which often times is unavailable particularly in urban areas. A smaller and more cost effective cellular base station for the wireless infrastructure is required.

Femtocells are small, short range base stations acting as indoor cellular access points for residential buildings or small offices. It is desired the femtocells to maintain continuous wireless connectivity for cellular devices as the cellular devices leave the coverage area of a first macro base station and enter the coverage area of a femtocell base station. The femtocells should maintain the continuous wireless connectivity via handovers from the macro base stations and/or from other femtocells. Handover is the procedure by which a cellular device seamlessly switches between different base stations during a connection to the network so that the connection is not interrupted during the switch.

Conventionally, a core network includes various combinations of macrocells and femtocells. The core network identifies various access points that support macrocells and femtocells using various identifiers. Often, these various network identifiers are not unique. Rather, in some situations, the same identifier can be used to identify more than one access point. As a result, the core network cannot be able to uniquely identify the access point. This is particularly troubling when handovers are performed in the core network. Large quantities of femtocells deployed in the same area can cause ambiguity to the core network with regard to which femtocell the core network should execute the handover to for a cellular device leaving the coverage area of a neighboring macro base station and/or femtocell. This ambiguity can result in the core network executing a handover for the cellular device to a femtocell that the cellular device is not within the coverage of. This can result in a disconnection from the wireless network and an interruption in the wireless service for the cellular device.

BRIEF DESCRIPTION OF THE DRAWINGS/FIGURES

Embodiments of the present disclosure are described with reference to the accompanying drawings. In the drawings, like reference numbers indicate identical or functionally similar elements. Additionally, the left most digit(s) of a reference number identifies the drawing in which the reference number first appears.

The present disclosure will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE PRESENT DISCLOSURE

The following Detailed Description refers to accompanying drawings to illustrate exemplary embodiments consistent with the present disclosure. References in the Detailed Description to "one exemplary embodiment," "an exemplary embodiment," "an example exemplary embodiment," etc., indicate that the exemplary embodiment described can include a particular feature, structure, or characteristic, but every exemplary embodiment cannot necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to effect such feature, structure, or characteristic in connection with other exemplary embodiments whether or not explicitly described.

The exemplary embodiments described herein are provided for illustrative purposes, and are not limiting. Other exemplary embodiments are possible, and modifications can be made to the exemplary embodiments within the spirit and scope of the present disclosure. Therefore, the Detailed Description is not meant to limit the present disclosure. Rather, the scope of the present disclosure is defined only in accordance with the following claims and their equivalents.

Embodiments of the present disclosure can be implemented in hardware, firmware, software, or any combination thereof. Embodiments of the present disclosure can also be implemented as instructions stored on a machine-readable medium, which can be read and executed by one or more processors. A machine-readable medium can include any mechanism for storing or transmitting information in a form readable by a machine (e.g., a computing device). For example, a machine-readable medium can include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions can be described herein as performing certain actions. However, it should be appreciated that such descriptions are merely for convenience and that such actions in fact result from computing devices, processors, controllers, or other devices executing the firmware, software, routines, instructions, etc.

For purposes of this discussion, each of the various components discussed can be considered a module, and the term "module" shall be understood to include at least one of software, firmware, and hardware (such as one or more circuit, microchip, or device, or any combination thereof), and any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

The following Detailed Description of the exemplary embodiments will so fully reveal the general nature of the present disclosure that others can, by applying knowledge of those skilled in relevant art(s), readily modify and/or adapt for various applications such exemplary embodiments, without undue experimentation, without departing from the spirit and scope of the present disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Overview

A cellular network can include various cell members, such as one or more macrocells, one or more microcells, such as one or more picocells or one or some femtocells to provide some examples, or any combination thereof. Such a network is also called Hetnet. The cellular network uses various network identifiers to identify these various cell members. Often, these various network identifiers are not unique. Rather, in some situations, the same network identifier can be used to identify more than one cell member. As a result, the core network cannot be able to uniquely identify the cell member. In these situations, the cellular network can request various cell members that share the same network identifier to provide cell parameters for identification purposes. The cellular network can evaluate the cell parameters to uniquely identify the various cell members that share the same network identifier.

An Exemplary Cellular Network

Figure 1:
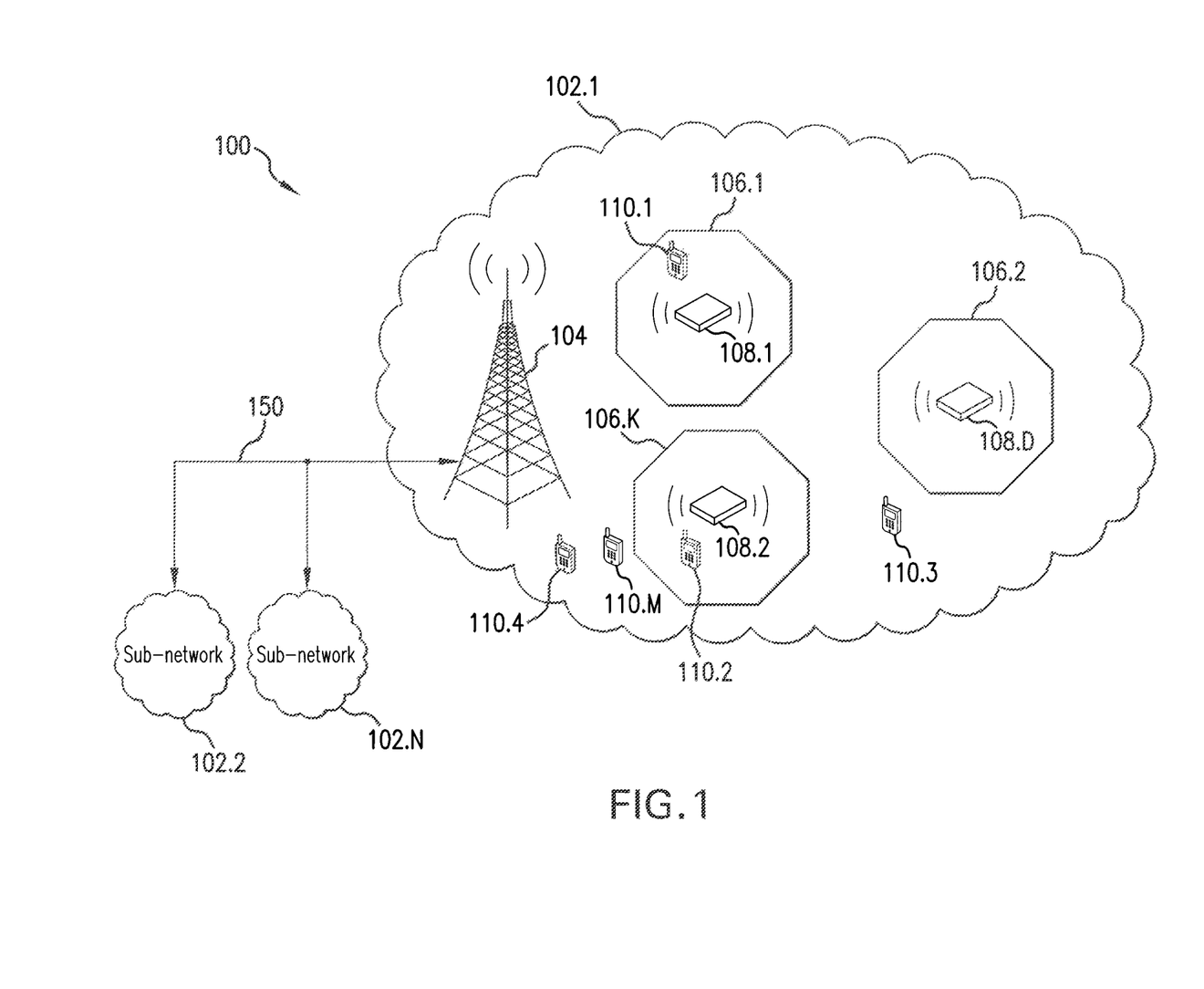
FIG. 1 illustrates an exemplary cellular network in accordance with an embodiment of the disclosure.

FIG. 1 illustrates an exemplary cellular network in accordance with an embodiment of the disclosure. A core network 100 represents a wireless communication network that supports wireless voice or data communications between cellular devices. The core network 100 can provide wireless connections to the cellular devices through one or more transceivers, referred to as cell sites. The cell sites are connected to a cellular telephone exchange that connects to a public telephone network or to another cellular telephone exchange within the core network 100.

The core network 100 includes sub networks 102.1 through 102.N. Each of the sub networks 102.1 through 102.N can include one or more macro base stations, femtocell access points, cellular devices or any combination of macro base stations, femtocell access points, and cellular devices; however the configuration and arrangements as well as the quantity of these devices can differ between sub networks.

The sub network 102.1 includes a macro base station 104, femtocells 106.1 through 106.k and cellular devices 110.1 through 110.m. The femtocells 106.1 through 106.k include a corresponding femtocell access point from among femtocell access point 108.1 through 108.d. In some situations, the femtocells 106.1 through 106.k can further include one or more of the cellular devices 110.1 through 110.m. For example, the femtocell 106.k includes the cellular device 110.2. The cellular devices 110.1 through 110.m can represent a smart phone, a smart tablet, a mobile telephone, a portable computing device, other computing devices such as a personal, a laptop, or a desktop computer, a computer peripheral such as a printer, a portable audio and/or a video player, and/or any other suitable electronic device that will be apparent to those skilled in the relevant art(s) without departing from the spirit and scope of the disclosure.

The sub networks 102.1 through 102.N can be coupled to each other via a backhaul connection 150 to form the core network 100. The backhaul connection 150 can include but not limited to a copper twisted pair connection, a T-1/E-1, connection, a digital subscriber line (DSL) connection, an optical fiber connection, a coaxial cable connection, and/or any other type of connection capable of supporting the communication of data as would be appreciated by those skilled in the relevant art(s) without departing from the scope of the disclosure. Although not shown in FIG. 1, the sub networks 102.1 through 102.N can couple to a public switched telephone network (PSTN), an Internet Protocol (IP) network, an interne network, intranet network and/or any other type of communication network as would be appreciated by those skilled in the relevant art(s) without departing from the scope of the disclosure via the backhaul connection 150.

The sub network 102.1 provides wireless service to the cellular devices 110.1 through 110.m via the macro base station 104. The macro base station 104 can be coupled to other sub networks from among the sub networks 102.1 through 102.N via the backhaul connection 150. The macro base station 104 can be a long range cellular base station used to provide wireless service covering large surface areas, often referred to as a macrocell. The macro base station 104 can provide wireless service based on cellular standards that include but are not limited to Interim Standard 95 (IS-95), Code Division Multiple Access (COMA), Global System for Mobile Communications (GSM), Time Division Multiple Access (TDMA), General Packet Radio Service (CPRS), Enhanced Data Rates for GSM Evolution (EDGE), UMTS, Wideband Code Division Multiple Access (WCDMA), Time Division Synchronous Code Division Multiple Access (TDSCDMA), High-Speed Downlink Packet Access (HSDPA), Long Term Evolution (LTE) and/ or any other suitable cellular standard that will be apparent to those skilled in the relevant art(s) without departing from the spirit and scope of the present disclosure.

The femtocells 106.1 through 106.k and cellular devices 110.1 are within the coverage area of the macro base station 104, namely within the macrocell. The femtocells 106.1 through 106.k include a corresponding femtocell access point 108.1 through 108.d. Typically, the femtocell access points 108.1 through 108.d provide significantly smaller coverage areas, often referred to as femtocell, for wireless service within the macrocell. The femtocell access points 108.1 through 108.d can provide wireless service based on cellular standards that include but are not limited to IS-95, CDMA, GSM, TDMA, GPRS, EDGE, UMTS, WCDMA, TDSCDMA, LTE, and HSDPA and/or any other suitable cellular standard that will be apparent to those skilled in the relevant art(s) without departing from the spirit and scope of the present disclosure.

The cellular devices 110.1 through 110.m can receive wireless service from either the macro base station 104 and/or the femtocell access points 108.1 through 108.d. For example, in some situations, the cellular devices 110.1 through 110.m can have wireless data consumption requirements that cannot solely be supported by the macro base station 104. The wireless data consumption requirements for the cellular devices 110.1 through 110.m can include but are not limited to services relating to computing capabilities, such as Short Message Service (SMS), electronic mail, Internet access, gaming, short range wireless communications, camera, Multimedia Messaging Service (MMS) messaging, digital audio player, radio, Global Positioning System (GPS) services, accessing social networks, online gaming, streaming, online videos, other traditional personal computing applications that are now available on cellular devices and/or any other suitable service that will be apparent to those skilled in the relevant art(s) without departing from the spirit and scope of the present disclosure.

Typically, the sub network 102.1 uses the macro base station 104 and/or the femtocell access points 108.1 through 108.d to provide continuous, or near continuous wireless connectivity for the cellular devices 110.1 through 110.m. As the cellular devices 110.1 through 110.m move or roam throughout a coverage area of the sub network 102.1, the sub network 102.1 hands off these cellular devices between various macro base stations and/or access points to maintain the continuous, seamless, or near continuous wireless connectivity. Typically, a handover procedure is performed within the sub network 102.1 when one of the cellular devices 110.1 through 110.m is associated with one of the femtocell access points 108.1 through 108.d and is re-associated with another femtocell access point 108.1 through 108.d. A hand-in handover procedure is performed within the sub network 102.1 when one of the cellular devices 110.1 through 110.m is associated with the macro base station 104 and is re-associated with one of the femtocell access points 108.1 through 108.d. A handout handover procedure is performed within the sub network 102.1 when one of the cellular devices 110.1 through 110.m is associated with one of the femtocell access points 108.1 through 108.d and is re-associated with the macro base station 104.

The sub network 102.1 executes these various handover procedures via a control channel. The control channel represents a central channel that is used to control the macro base station 104 and/or the femtocell access points 108.1 through 108.d. The control channel can include but is not limited to a Broadcast Control Channel (BCCH), a Frequency Control Channel (FCCH), a Synchronization Channel (SCH), a Common Control Channel (CCCH), a Random Access Channel (RACH), a Paging Channel (PCH), an Access Grant Control Channel (AGCH), a Cell Broadcast Channel (CBCH), a Dedicated Control Channel (DCCH), a Stand-alone Dedicated Control Channel (SDCCH), an Associated Control Channel (ACCH), a Slow Associated Control Channel (SACCH), a Fast Associated Control Channel (FACCH) and/or any other suitable control channel that will be apparent to those skilled in the relevant art(s) without departing from the spirit and scope of the present disclosure.

During execution of the handover procedure, the sub network 102.1 identifies the femtocell access point 108.1 through 108.d to which the cellular devices 110.1 through 110.m are to be re-associated with. The femtocell access points 108.1 through 108.d are configured with a network identifier to allow the sub network 102.1 for identification purposes. For example, the network identifier can include a primary scrambling code (PSC). The PSC represents a scrambling code that is used by the femtocell access points 108.1 through 108.d when communicating using the control channel. Often, the network identifiers are not unique. Rather, in some situations, the same network identifier can be used to identify more than one of the access points 108.1 through 108.d. As a result, the sub network 102.1 cannot be able to uniquely identify the access points 108.1 through 108.d.

A Second and Third Exemplary Cellular Network

Figure 2A:
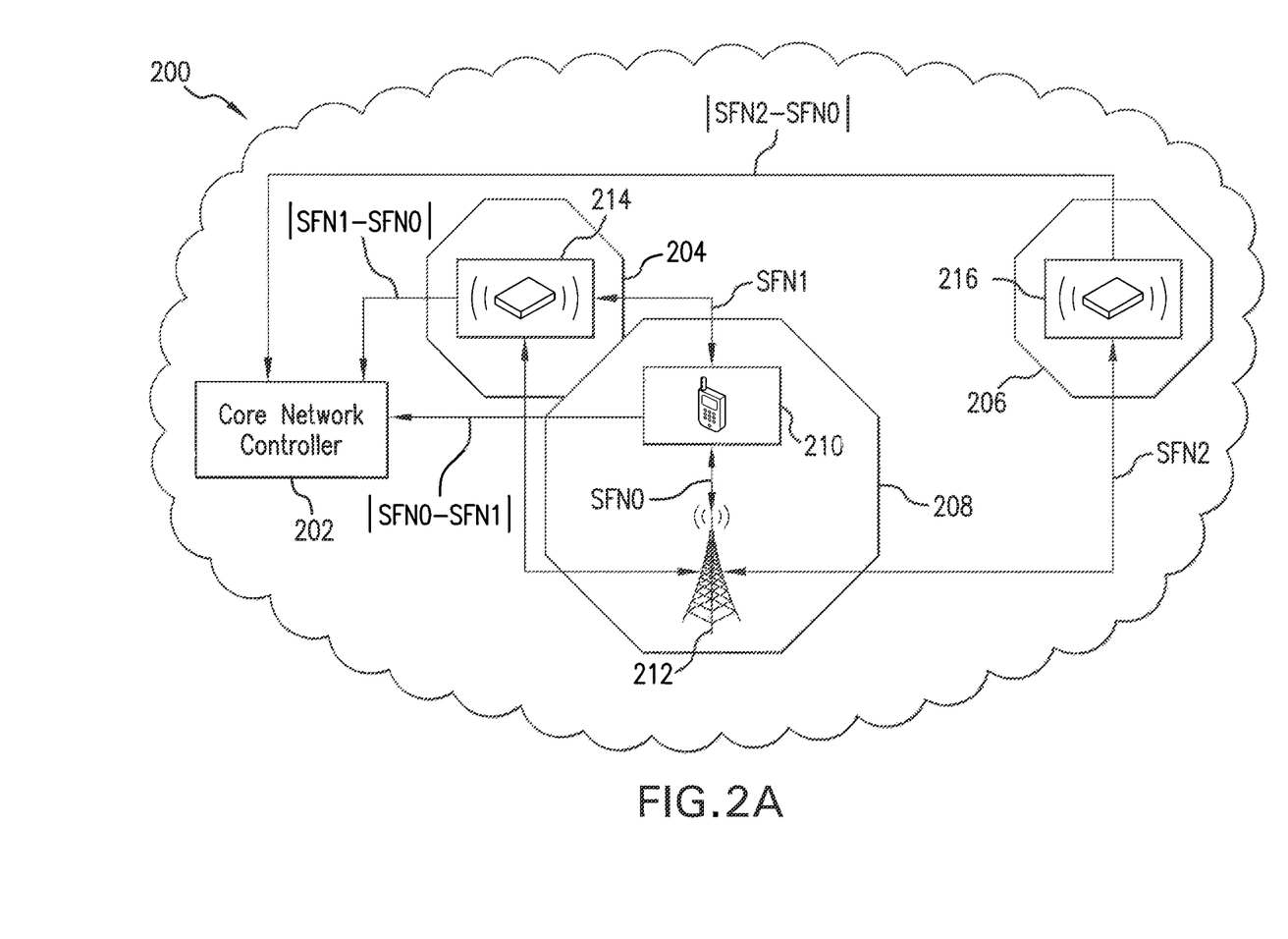
FIG. 2A illustrates a second exemplary cellular network in accordance with an embodiment of the disclosure.
Figure 2B:
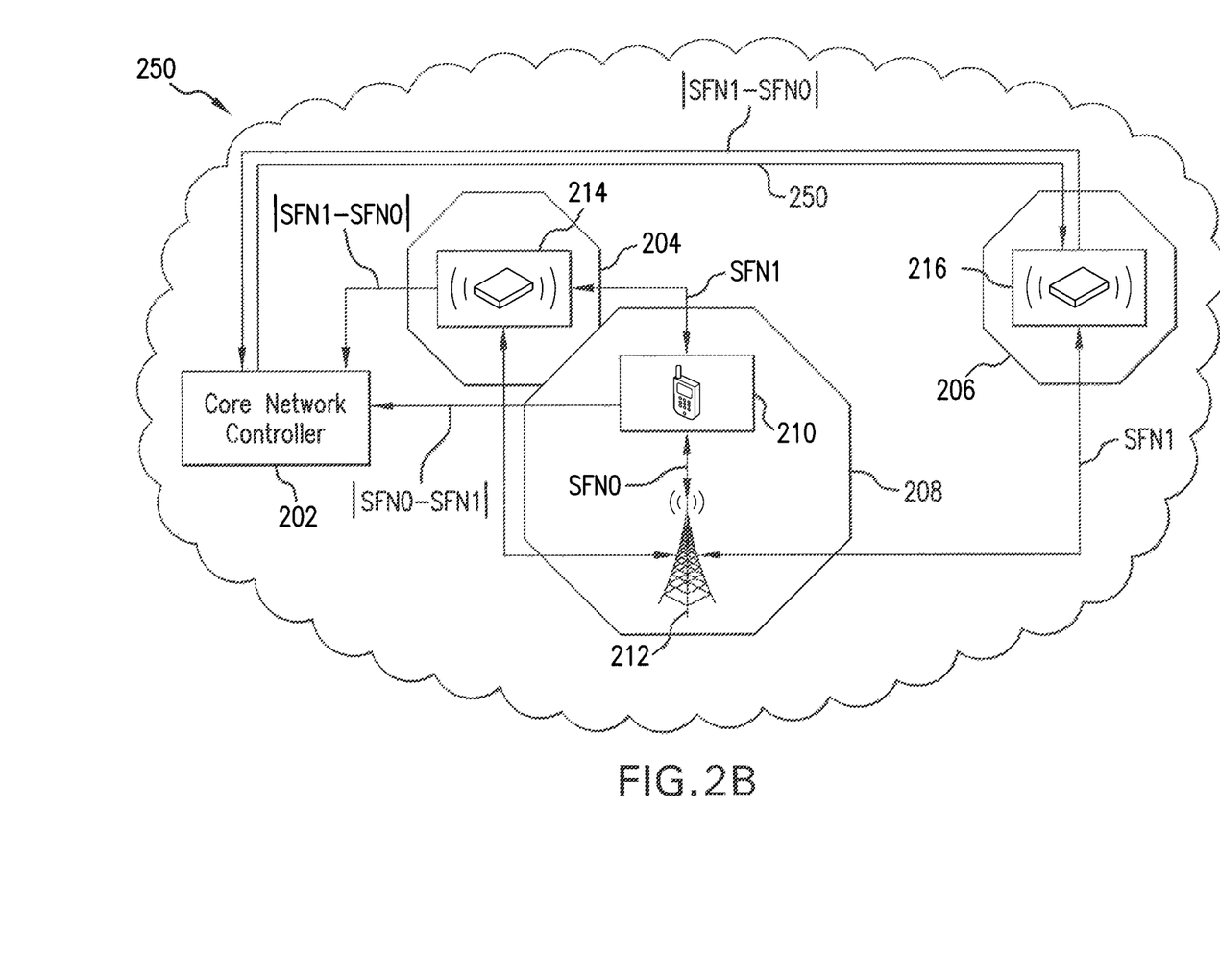
FIG. 2B illustrates a third exemplary cellular network in accordance with an embodiment of the disclosure.

FIGS. 2A and 2B each illustrate an exemplary cellular network, in accordance with an embodiment of the disclosure. In those situations in which the network identifiers are not unique, core networks 200 and 250 use various cell parameters for identification purposes. The core networks 200 and 250 can evaluate the cell parameters to uniquely identify the various cell members that share the same network identifier. The core networks 200 and 250 include a core network controller 202, a macro cell 208, a first femtocell 204, and a second femtocell 206. The macro cell 208 includes a macro base station 212 and the cellular device 210. The first femtocell 204 includes a femtocell access point 214. The second femtocell 206 includes a femtocell access point 216. The core networks 200 and 250 share many similar features with the core network 100; therefore, only the differences between the core networks 200 and 250 and the core network 100 are to be discussed in further detail.

As noted above, each femtocell access point 214 and 216 can be assigned an identification code, such as the PSC to provide an example, from the core network controller 202. In some instances, more than one femtocell access point 214 and 216 can be assigned substantially similar PSCs. The assignment of the substantially similar PSCs to the femto cell access points 214 and 216 can result in ambiguity for the core network controller 202 when identifying those access points that have the substantially similar PSCs in the same geographical area.

To overcome the ambiguity, the core network controller 202 determines uniquely identifies those access points that have the substantially similar PSCs based on cell parameters. For example, if the femtocell access points 214 and 216 have substantially similar PSCs, the cellular device 210 and the femtocell access points 214 and 216 can provide cell parameters to the core network controller 202. The core network controller 202 can examine each of the cell parameters to determine which cell parameters provided by the femtocell access points 214 and 216 can be substantially equivalent to the cell parameters provided by the cellular device 210 to uniquely identify the femtocell access points 214 and 216. The cell parameters provided by the cellular device 210 and the femtocell access points 214 and 216 can include cell parameters that reflect an observed time difference indicator between the macro base station 212 and each the femtocell access points 214 and 216. The observed time difference indicator can also include a difference in frame starts between the macro base station 212 and the femtocell access points 214 and 216. The cellular device 210 and the femtocell access points 214 and 216 can measure the differences in frame starts by measuring the difference in Connection Frame Number (CFN), a combination of SFN and CFN, and/or any other suitable method in differentiating a measurable cell parameter between base stations and cellular devices that will be apparent to those skilled in the relevant art(s) without departing from the spirit and scope of the present disclosure. The observed time difference indicator can further include a difference in System Frame Number (SFN) between the macro base station 212 and the femtocell access points 214 and 216.

In an example, the cellular device 210 is within the macro cell 208 supported by the macro base station 212. The cellular device 210 is connected to the core network 200 via the macro base station 212 and receiving wireless service therefrom. The cellular device 210 can leave the macro cell 208 supported by the macro base station 212 and enter the femtocell 204 supported by the femtocell access point 214. However, when the femtocell access points 214 and 216 include substantially similar PSCs resulting in ambiguity for the core network controller 202 in determining whether to hand over the cellular device 210 to femtocell 204 or femotcell 206.

To overcome the ambiguity, the core network controller 202 requests that the cellular device 210 and the femtocell access points 214 and 216 provide SFN measurements. The macro base station 212 can be characterized as having an SFN of SFN0 and the femtocell access points 214 and 216 can be characterized as having SFNs of SFN1 and SFN2, respectively. The cellular device 210 provides the SFN difference |SFN0-SFN1| between the SFN for the macro base station 212, namely, SFN0, and the SFN for the femtocell access point 214, namely, SFN1. The femtocell access point 214 provides the SFN difference |SFN1-SFN0| between the SFN for the femtocell access point 214, namely, SFN1, and the SFN for the macro base station 212, namely, SFN0. The femtocell access point 216 provides the SFN difference |SFN2-SFN0| between the SFN for the femtocell access point 216, namely, SFN2 and the SFN for the macro cell, namely, SFN0.

The core network controller 202 compares the |SFN0-SFN1| provided by the cellular device 210 with the |SFN1-SFN0| provided by the femtocell access point 214 and the |SFN2-SFN0| provided by the femtocell access point 216. The core network controller 202 determines that the |SFN0-SFN1| provided by the cellular device and the |SFN1-SFN0| provided by the femtocell access point 214 are substantially equivalent thereby uniquely identifying that the cellular device 210 is to be handed over to the femtocell access point 214.

In some situations, as demonstrated in FIG. 2B, the core network controller 202 can still not be able to differentiate between femtocells when femtocell access points provide differences in SFN that are substantially equivalent to each other. For example, if the macro base station 212 can be characterized as having an SFN of SFN0 and the femtocell access points 214 and 216 can both be characterized as having SFNs of SFN1. The femtocell access point 214 can have a time stamp representing the frame start of a frame that is substantially equivalent to that of the femtocell access point 216. The difference |SFN1-SFN0| between the femtocell access point 214 and the macro base station 212 (SFN0) can be substantially equivalent to the difference in |SFN1-SFN0| between the femtocell access point 216 and the macro base station 212. To further differentiate femtocell access points with substantially similar PSCs and substantially equivalent time stamps representing the frame starts, the core network controller 202 can send a time shift request to request that one of the femtocell access points 214 and 216 perform a time shift in its frame start. The core network controller 202 can request that a femtocell access point perform a time shift in its frame start that can be sufficient for the core network controller 202 to differentiate between the difference in SFN provided by each femtocell access point 214 and 216. The core network controller 202 can then be able to properly determine which femtocell 204 and 206 to hand over the cellular device 210 to based on the difference in SFN provided by each femtocell access point 214 and 216 and the cellular device 210.

A Third Exemplary Cellular Network

Figure 3:
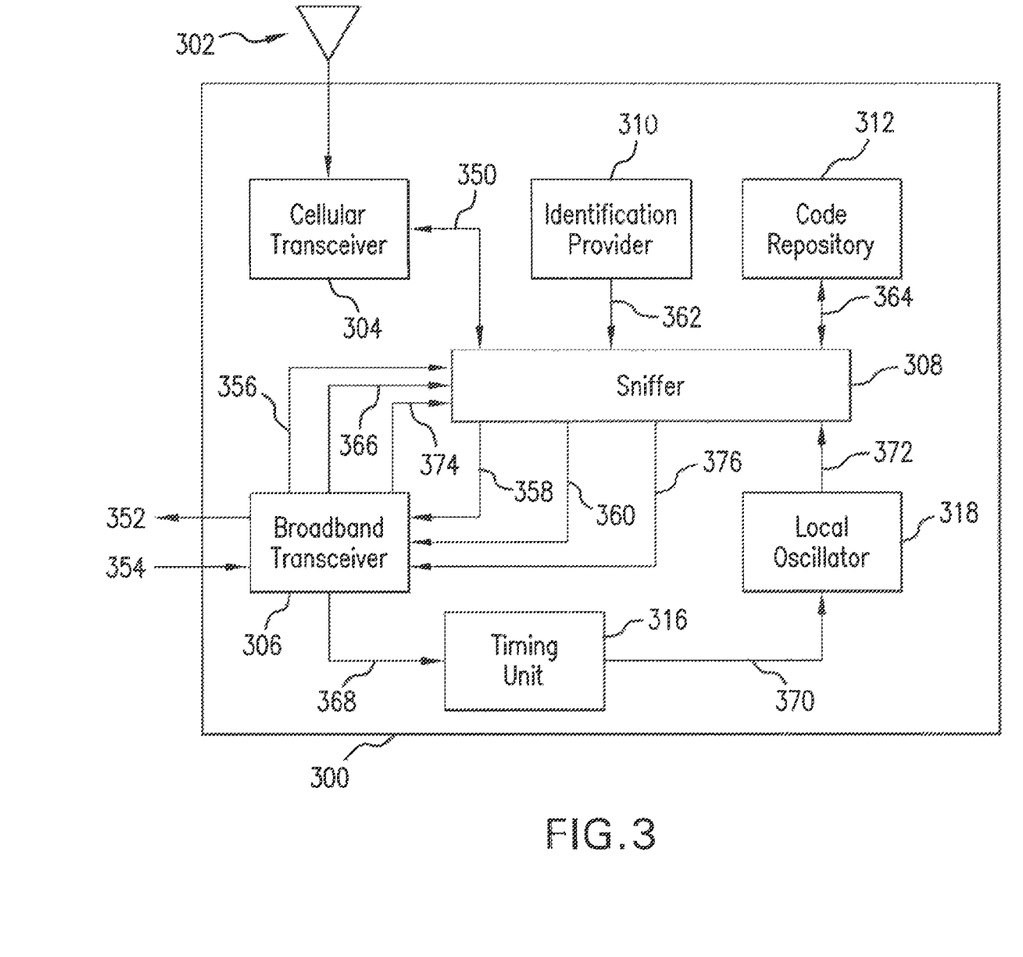
FIG. 3 illustrates is a block diagram of an exemplary femtocell access point that can be used in a cellular network according to an exemplary embodiment of the present disclosure.

FIG. 3 illustrates is a block diagram of an exemplary femtocell that can be used in the core network according to an exemplary embodiment of the present disclosure. The femtocell access point 300 includes a sniffer 308 that measures the difference in SFN between the femtocell access point 300 and each neighboring base station to the femtocell access point 300 and provides the difference in SFN to the core network. The femtocell access point 300 also includes a timing unit 316. The timing unit 316 adjusts a frame start of the femtocell access point 300 when requested by the core network so that the time difference between the femtocell access point 300 and each neighboring base station can differ. The femtocell access point 300 includes an antenna 302, a cellular transceiver 304, a broadband transceiver 306, a sniffer 308, an identification provider 310, a code repository 312, a timing unit 316, and a local oscillator. The femtocell access point 300 shares many similar features with the femtocell access points 108.1 through 108.d and the femtocell access points 214 and 216; therefore only the differences between the femtocell access point 300 and the femtocell access points 108.1 through 108.d and the femtocell access points 214 and 216 are to be discussed in further detail.

The antenna 302 captures a received voice or data communication from one or more fixed location transceivers and/or provides a transmitted voice or data communication from the cellular transceiver 304 to the one or more fixed location transceivers.

The broadband transceiver 306 can include one or more amplifiers, such as one or more low noise amplifiers (LNAs) and/or one or more low noise block converters (LNBs) to provide some examples, to amplify the received broadband data 354. The broadband transceiver 306 can additionally include one or more filters to filter the received broadband data 354 and/or the transmitted broadband data 352, respectively. The cellular transceiver 304 can further include one or more mixers to downconvert the received broadband data 354 and/or upconvert the transmitted broadband data 352. The broadband transceiver 306 can yet further include a diplexer or switch to separate the received broadband data 354 from the transmitted broadband data 352. The received broadband data 354 and/or the transmitted broadband data 352 can be received and/or transmitted via a copper twisted pair, a T-1/E-1 line, DSL, an optical fiber, a coaxial cable, and/or any other type of connection capable of supporting the communication of data as would be appreciated by those skilled in the relevant art(s) without departing from the scope of the disclosure.

The sniffer 308 can perform a sniffing process where the sniffer 308 retrieves an identification code from a core network controller. For example, the sniffer can retrieve the PSC from the core network controller. The sniffer 308 can request the PSC from the core network controller via the PSC data 376. The broadband transceiver 306 can upconvert the PSC data 376 into the transmitted broadband data 352 and transmit the PSC data 376 to the core network controller. The core network controller can provide a PSC to the femtocell access point 300 via the received broadband data 354. The broadband transceiver can downconvert the received broadband data 354 to provide the PSC 374 to the sniffer 308. The sniffer can store the PSC 364 in the code repository 312.

The core network controller can request the PSC from the femtocell access point 300. Upon downconverting such a request in the received broadband data 354, the broadband transceiver 306 can send a request for the PSC via the PSC 374. The sniffer 308 can retrieve the PSC 364 from the code repository 312. The sniffer 308 can provide the PSC data 376 to the broadband transceiver 306. The broadband transceiver 306 can upconvert the PSC data 376 into the transmitted broadband data 352 to provide the transmitted broadband data 352 to the core network.

As noted above, the core network controller can request cell parameters from the femtocell access point 300. Upon downconverting such a request in the received broadband data 354, the broadband transceiver 306 can send a request for base station cell parameters 356 to the sniffer 308. The stiffer 308 can perform a sniffing process where the sniffer 308 retrieves the base station cell parameters 356 from each neighboring macro cell and/or femtocell. The base station cell parameters 356 can be provided to the sniffer by the broadband transceiver 306 via the received broadband data 354 received from each neighboring macro base station and/or femtocell access point. In an example, the sniffer 308 can retrieve SFN information from each neighboring macro base station and/or femtocell access point via the base station cell parameters 356. The sniffer 308 can compare the retrieved base station cell parameters 356 to the femtocell data. For example, the sniffer 308 can determine the difference in SFN between the neighboring macro cell base stations and/or femtocell access points with the SFN of the femtocell access point 300. The sniffer 308 can then provide the base station cell parameter difference 358 to the broadband transceiver 306. The broadband transceiver can upconvert the base station cell parameter difference 358 into the transmitted broadband data 352 and provide the transmitted broadband data 352 to the core network.

If the core network controller hands over a cellular device to the femtocell access point 300, the sniffer can activate the cellular transceiver 304 with cellular device activation 350. Once the cellular transceiver 304 receives the cellular device activation 350, the cellular transceiver operates as noted above.

As noted above, the femtocell access point 300 can provide a cell identification 362 along with the base station cell parameter difference 358 to the core network controller. The cell identification is a identification of the femtocell access point 300. The cell identification 362 can be stored in the identification provider 310. The sniffer 308 can provide cell identification 360 to the broadband transceiver 306. The broadband transceiver 306 can upconvert the cell identification 360 into the transmitted broadband data 352 and provide the transmitted broadband data 352 to the core network controller.

As noted above, the sniffer 308 can provide the base station cell parameter difference 358, the cell identification 360, and/or the PSC data 376 to the core network controller based on periodic requests for the base station cell parameter difference 358, the cell identification 362, and/or the PSC data 376 from the core network controller. The sniffer 308 can also provide the base station cell parameter difference 358, the cell identification 360, and/or the PSC data 376 to the core network controller on a periodic basis without requests from the core network controller.

As noted above, the core network controller can request the femtocell access point 300 to adjust its frame start. The broadband transceiver 306 can downconvert the received broadband data 354 to obtain frame start adjustment request 368. The timing unit 316 adjusts the frame start of the local oscillator 318 with frame start control signal 370 based on the frame start adjustment request 368. The timing unit 316 adjusts the frame start control signal 370 so that the local oscillator 318 adjusts the frame start of the femtocell access point 300 sufficiently so that the core network can differentiate the femtocell access point 300 from other femtocells. The local oscillator 318 provides adjusted frame start 372 to the sniffer 308. The sniffer 308 can determine the difference in SFN between the femtocell access point 300 and other neighboring base stations based on the adjusted frame start 372. The sniffer can provide the adjusted SFN in the base station cell parameter difference 358 to the broadband transceiver 306. The broadband transceiver can upconvert the adjusted SFN provided by the base station cell parameter difference 358 into the transmitted broadband data 352 and provide the transmitted broadband data 352 to the core network controller.

An Exemplary Core Network Controller

Figure 4:
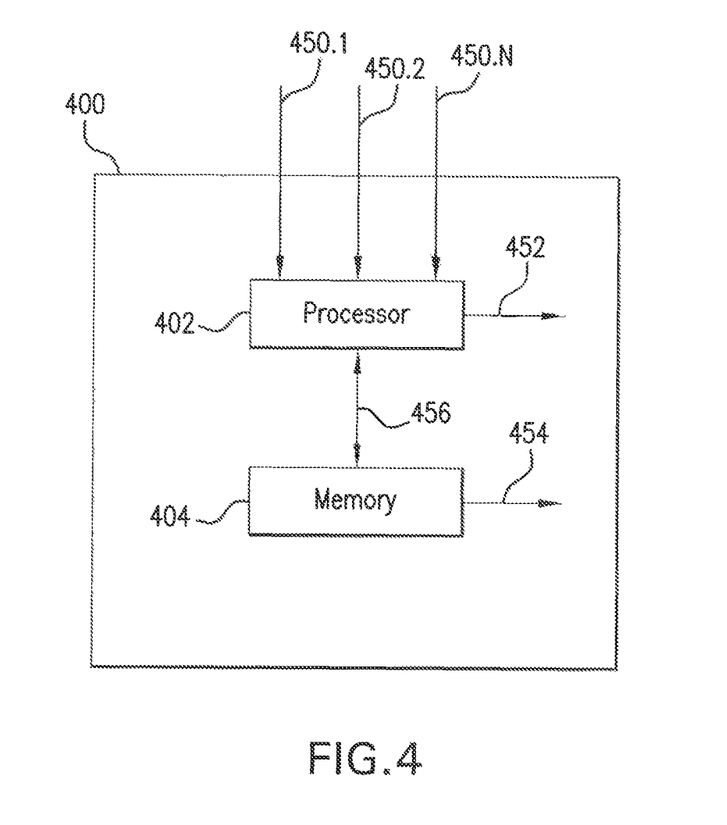
FIG. 4 is a block diagram of an exemplary core network controller in accordance with an embodiment of the disclosure.

FIG. 4 illustrates a block diagram of a core network controller according to an exemplary embodiment of the disclosure. The core network controller 400 includes a processor 402 and a memory 404. The core network controller 400 shares many similar features with the core network controller 202; therefore only the differences between the core network controller 202 and the core network controller 400 are to be discussed in further detail.

As noted above regarding the core network controller 202, the core network controller 400 can receive cell parameters 450.1 from a cellular phone attempting to move from a first cell to a second cell. The network controller 400 can also receive cell parameters 450.2 through 450.N from neighboring base stations and/or access points. The processor 402 can store the stored cell parameters 456 in memory 404.

As noted above, the processor 402 can determine the cell in which to hand over the cellular device to based on the cell parameters 450.1 through 450.N. The processor 402 can execute the handover procedure with handover procedure signal 452. The processor 402 can also request that an access point shift its frame start with frame start shift request 454.

An Exemplary Operational Control Flow of the Core Network

Figure 5:
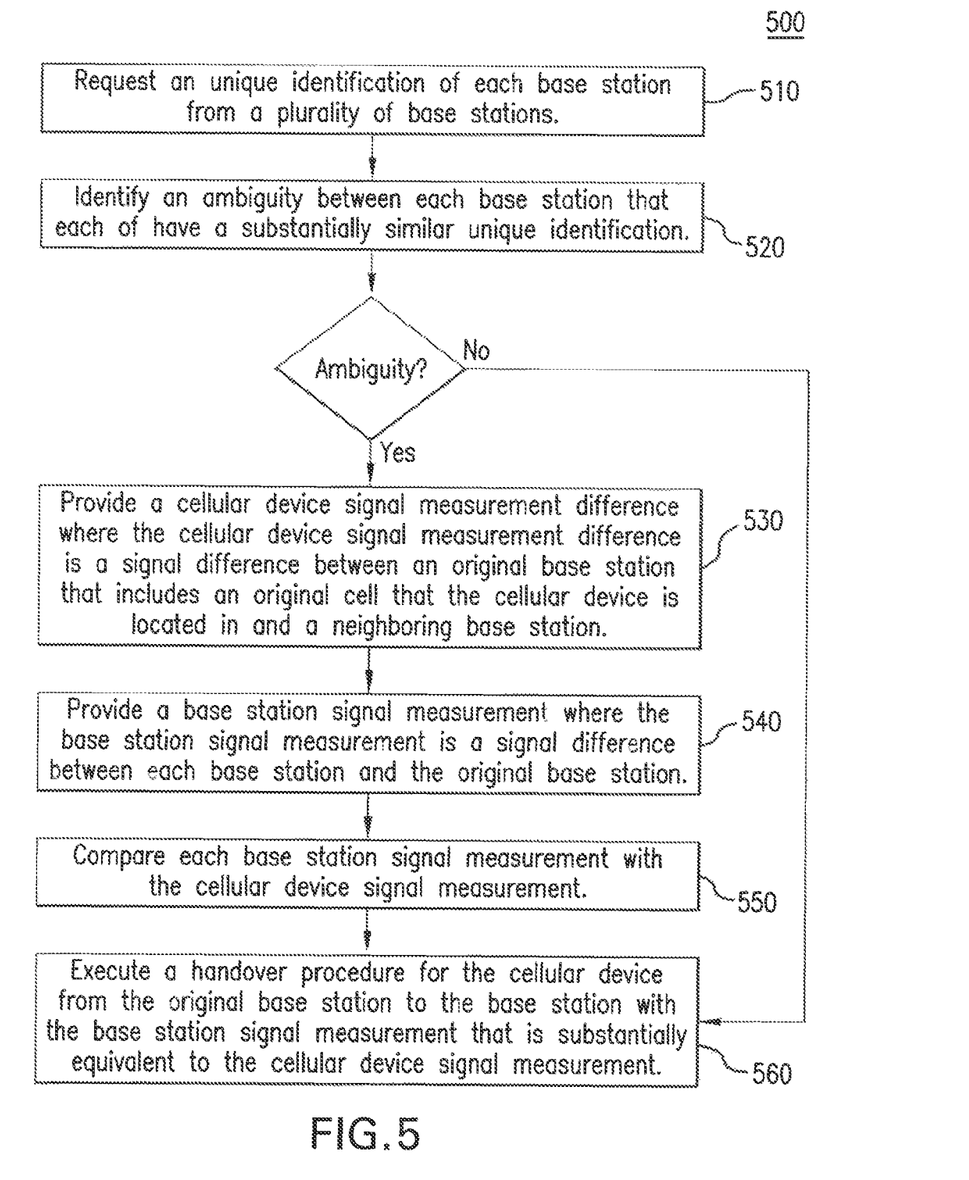
FIG. 5 is a flowchart of exemplary operational steps of the core network according to an exemplary embodiment of the present disclosure.

FIG. 5 is a flowchart of exemplary operational steps of the core network according to an exemplary embodiment of the present disclosure. The present disclosure is not limited to this operational description. Rather, it will be apparent to persons skilled in the relevant art(s) from the teaching herein that other operational control flows are within the scope and spirit of the present disclosure. The following discussion describes the steps in FIG. 5.

At step 510, the operational control flow requests an identification of each base station from a plurality of base stations.

At step 520, the operational control flow identifies an ambiguity between a first base station and a second base station that each have a substantially similar identification. If the identification for the first femtocell access point is substantially similar to the identification of the second femtocell access point, then the operational control flow proceeds to providing cell parameter differences. If the identification for the first femtocell access point is not substantially similar to the identification for the second femtocell access point, then the operational control flow proceeds to executing a handover procedure. For example, the operational control flow identifies whether a PSC for a first femtocell access point, such as femtocell access point 214 to provide an example, is substantially similar to a PSC for a second femtocell access point, such as the femtocell 216 access point to provide an example. If the PSC for the femtocell access point 214 is substantially similar to the PSC of the femtocell access point 216, then cell parameter differences are required and the operational control flow proceeds to step 530. If the PSC for the femtocell access point 214 is not substantially similar to the PSC of the femtocell access point 216, then cell parameter differences are not required and the operational control flow proceeds to step 560.

At step 530, the operational control flow provides a cellular device cell parameter difference where the cellular device cell parameter difference is a cell parameter difference between an original base station that includes an original cell that the cellular device is located in and a neighboring base station. Specifically, a cellular device, such as the cellular device 210 to provide an example, provides a cellular device cell parameter difference, such as |SFN0-SFN1| to provide an example, where the |SFN0-SFN1| is a cell parameter difference between an original base station, such as the macro base station 212 to provide an example, that includes an original cell, such as the macro cell 208 to provide an example, that the cellular device 210 is located in and a neighboring base station, such as the femtocell access point 214 to provide an example.

At step 540, the operational control flow provides a base station cell parameter difference where the base station cell parameter difference is a cell parameter difference between each base station and the original base station. Specifically, a base station, such as the femtocell access point 214 to provide an example, provides a base station cell parameter difference, such |SFN1-SFN0| to provide an example, between itself and the original base station, such as the macro base station 212 to provide an example.

At step 550, the operational control flow compares each base station cell parameter difference with the cellular device cell parameter difference. Specifically, each base station cell parameter difference, such as |SFN2-SFN0| to provide an example, is compared with the cellular device cell parameter difference, such as the |SFN0-SFN1|, to provide an example.

At step 560, the operational control flow executes a handover procedure for the cellular device from the original base station to the base station with the base station cell parameter difference that is substantially equivalent to the cellular device cell parameter difference. Specifically, a handover procedure is executed for the cellular device, such as the cellular device 210 to provide an example, from the original base station, such as the macro base station 212, to the base station, such as the femtocell access point 214 to provide an example, with the base station cell parameter difference, such as the |SFN1-SFN0| to provide an example, that is substantially equivalent to the cellular device cell parameter difference, such as the |SFN0-SFN1| to provide an example.

CONCLUSION

It is to be appreciated that the Detailed Description section, and not the Abstract section, is intended to be used to interpret the claims. The Abstract section can set forth one or more, but not all exemplary embodiments, of the present disclosure, and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

It will be apparent to those skilled in the relevant art(s) that various changes in form and detail can be made therein without departing from the spirit and scope of the present disclosure. Thus the present disclosure should not be limited by any of the above-described exemplary embodiments, but should be defined only in accordance with the following claims and their equivalents.

What is claimed is:

1. A core network controller, comprising:
a processor configured to:
receive a cellular device cell parameter difference provided by a cellular device located within a macro cell, wherein the cellular device cell parameter difference comprises a difference between a macro base station cell parameter and a neighboring base station cell parameter,
receive a first femtocell access point cell parameter difference and a second femtocell access point cell parameter difference provided by a first femtocell access point and a second femtocell access point, respectively, from among a plurality of femtocell access points, wherein the first femtocell access point cell parameter difference and the second femtocell access point cell parameter difference comprise differences between a first femtocell access point cell parameter and a second femtocell access point cell parameter, respectively, and the macro base station cell parameter,
determine whether the first femtocell access point cell parameter difference is substantially equivalent to the second femtocell access point cell parameter difference;
request the first femtocell access point to adjust a frame start of the first femtocell access point when the first femtocell access point cell parameter difference is substantially equivalent to the second femtocell access point cell parameter difference and to provide an adjusted first femtocell access point cell parameter difference such that the adjusted first femtocell access point cell parameter difference is distinguishable from the second femtocell access point cell parameter difference, compare the cellular device cell parameter difference with the adjusted first femtocell cell access point cell parameter difference and the second femtocell access point cell parameter difference to determine which femtocell cell access point cell parameter difference is substantially equivalent to the cellular device cell parameter difference, and execute a handover procedure for the cellular device to the first femtocell access point or the second femtocell access point based on whose femtocell access point cell parameter difference is substantially equivalent to the cellular device cell parameter difference; and a memory configured to store the first femtocell access point cell parameter difference, the second femtocell access point cell parameter difference, and the cellular device cell parameter difference.

2. The core network controller of claim 1, wherein the macro base station cell parameter comprises:

a frame start for a macro base station corresponding to the macro base station cell parameter, and wherein the neighboring base station cell parameter comprises:

a frame start for a neighboring femtocell access point corresponding to the neighboring base station cell parameter.

3. The core network controller of claim 1, wherein the macro base station cell parameter comprises:

a system frame number (SFN) for a macro base station corresponding to the macro base station cell parameter, and wherein the neighboring base station cell parameter comprises:

an SFN for a neighboring femtocell access point corresponding to the neighboring base station cell parameter.

4. The core network controller of claim 1, wherein the first femtocell access point cell parameter and the second femtocell access point cell parameter comprise:

the frame start for the first femtocell access point and a frame start for the second femtocell access point, respectively, corresponding to the first femtocell access point cell parameter and the second femtocell access point cell parameter, respectively, and wherein the macro base station cell parameter comprises:

a frame start for a macro base station corresponding to the macro base station cell parameter.

5. The core network controller of claim 4, wherein the first femtocell access point cell parameter and the second femtocell access point cell parameter further comprise:

a system frame number (SFN) for the first femtocell access point and the second femtocell access point, respectively, and wherein the macro base station cell parameter further comprises:

an SFN for the macro base station.

6. A method, comprising:

receiving a cellular device cell parameter difference provided by a cellular device located within a macro cell, wherein the cellular device cell parameter difference comprises a difference between a macro base station cell parameter and a neighboring base station cell parameter;

receiving a first femtocell access point cell parameter difference and a second femtocell access point cell parameter difference from a first femtocell access point and a second femtocell access point, respectively, from among a plurality of femtocell access points, wherein the first femtocell access point cell parameter difference and the second femtocell access point cell parameter difference comprise a difference between a first femtocell access point cell parameter and a second femtocell access point cell parameter, respectively, and the macro base station cell parameter;

determining whether the first femtocell access point cell parameter difference is substantially equivalent to the second femtocell access point cell parameter difference;

requesting the first femtocell access point to adjust a frame start of the first femtocell access point when the first femtocell parameter difference is substantially equivalent to the second femtocell parameter difference and to provide an adjusted first femtocell parameter difference such that the adjusted first femtocell access point cell parameter difference is distinguishable from the second femtocell access point cell parameter difference, comparing the cellular device cell parameter difference with the adjusted first cell parameter difference and the second femtocell access point cell parameter difference to determine which femtocell cell parameter difference is substantially equivalent to the cellular device cell parameter difference; and executing a handover procedure for the cellular device to the first femtocell access point or the second femtocell access point whose femtocell cell parameter difference is substantially equivalent to the cellular device cell parameter difference.

7. The method of claim 6, wherein the macro base station cell parameter comprises:

a frame start for a macro base station corresponding to the macro base station cell parameter, and wherein the neighboring base station cell parameter comprises:

a frame start for a neighboring femtocell access point corresponding to the neighboring base station cell parameter.

8. The method of claim 6, wherein the macro base station cell parameter comprises:

a system frame number (SFN) for a macro base station corresponding to the macro base station cell parameter, and wherein the neighboring base station cell parameter comprises:

an SFN for a neighboring femtocell access point corresponding to the neighboring base station cell parameter.

9. The method of claim 6, wherein the first femtocell access point cell parameter and the second femtocell access point cell parameter comprise:

the frame start for the first femtocell access point and a frame start for the second femtocell access point, respectively, and wherein the macro base station cell parameter comprises:

a frame start for a macro base station corresponding to the macro base station cell parameter.

10. The method of claim 9, wherein the first femtocell access point cell parameter and the second femtocell access point cell parameter further comprise:

a system frame number (SFN) for the first femtocell access point and the second femtocell access point, respectively, and wherein the macro base station cell parameter comprises:

an SFN for the macro base station.

11. A core network controller, comprising:

a processor configured to:

determine whether a first cell parameter difference from a first femtocell access point is substantially equivalent to a second cell parameter difference from a second femtocell access point;

request the first femtocell access point to adjust a frame start of the first femtocell access point when the first cell parameter difference is substantially equivalent to the second cell parameter difference and to provide an adjusted first cell parameter difference such that the adjusted first cell parameter difference is distinguishable from the second cell parameter difference;

examine the adjusted first cell parameter difference and the second cell parameter difference to determine whether the adjusted first cell parameter difference or the second cell parameter difference is substantially equivalent to a third cell parameter difference corresponding to a mobile communication device; and execute a handover procedure for the mobile communication device to the first femtocell access point or the second femtocell access point based on which one of the first cell parameter difference or the second cell parameter difference is substantially equivalent to the third cell parameter difference; and a memory that stores the first cell parameter difference, the second cell parameter difference, and the third cell parameter difference.

12. The core network controller of claim 11, wherein the the first cell parameter difference, the second cell parameter difference, and the third cell parameter difference indicate an observed time difference indicator between a macro base station and the first femtocell access point, the second femtocell access point, and the mobile communication device, respectively.

13. The core network controller of claim 11, wherein the processor is further configured to execute the handover procedure based on a differences between a system frame number (SFN) of the macro base station, an SFN of the first femtocell access point, and an SFN of the second femtocell access point.

14. The core network controller of claim 13, wherein the processor is further configured to compare a first SFN difference between the first femtocell access point and the macro base station with a second SFN difference between the second femtocell access point and the macro base station to execute the handover procedure.

15. The core network controller of claim 11, wherein the processor is further configured to determine whether to handover the mobile communication device to the first femtocell access point or the second femtocell access point based on a time shift.

* * * * *

UNITED STATES PATENT AND TRADEMARK OFFICE
CERTIFICATE OF CORRECTION

PATENT NO. : 9,479,978 B2  
APPLICATION NO. : 13/491646  
DATED : October 25, 2016  
INVENTOR(S) : Carmon et al.

Page 1 of 1

It is certified that error appears in the above-identified patent and that said Letters Patent is hereby corrected as shown below:

On the Title Page

Item (56), Foreign Patent Documents, replace "CN EP 2375807 A1" with -- EP 2375807 A1 --.

Signed and Sealed this
Tenth Day of September, 2019

Andrei Iancu
*Director of the United States Patent and Trademark Office*